(12) United States Patent
Philips

(10) Patent No.: US 7,984,857 B2
(45) Date of Patent: Jul. 26, 2011

(54) SYSTEM AND METHOD ENABLING FOURTH LINE EMBOSSING ON CONTACTLESS CARDS

(75) Inventor: Simon Philips, Copmanthorpe (GB)

(73) Assignee: MasterCard International Incorporated, Purchase, NY (US)

( * ) Notice: Subject to any disclaimer, the term of this patent is extended or adjusted under 35 U.S.C. 154(b) by 859 days.

(21) Appl. No.: 11/866,550

(22) Filed: Oct. 3, 2007

(65) Prior Publication Data

US 2008/0203171 A1  Aug. 28, 2008

Related U.S. Application Data

(63) Continuation of application No. PCT/US2006/012290, filed on Apr. 4, 2006.

(60) Provisional application No. 60/668,307, filed on Apr. 4, 2005.

(51) Int. Cl.
*G06K 19/06* (2006.01)

(52) U.S. Cl. .................................. 235/492; 29/852

(58) Field of Classification Search .............. 235/492
See application file for complete search history.

(56) References Cited

U.S. PATENT DOCUMENTS

| | | | |
|---|---|---|---|
| 6,049,461 A | | 4/2000 | Haghiri-Tehrani et al. |
| 6,378,774 B1 * | | 4/2002 | Emori et al. .................. 235/492 |
| 6,839,963 B1 * | | 1/2005 | Haghiri-Tehrani et al. ..... 29/852 |
| 2001/0030238 A1 | | 10/2001 | Arisawa |
| 2004/0118930 A1 * | | 6/2004 | Berardi et al. ................ 235/492 |
| 2004/0256469 A1 * | | 12/2004 | Faenza et al. ................ 235/492 |

FOREIGN PATENT DOCUMENTS

| | | |
|---|---|---|
| JP | 0863565 | 3/1996 |
| JP | 2004152207 | 5/2004 |

* cited by examiner

*Primary Examiner* — Michael G Lee
*Assistant Examiner* — Kristy A Haupt
(74) *Attorney, Agent, or Firm* — Baker Botts L.L.P.

(57) ABSTRACT

Antenna designs are provided for contactless payment cards. The antennas have reduced size compared to the size of traditional rectangular antennas deployed in ISO-format contactless payment cards. The reduced size antennas are geometrical disposed in areas removed from card areas designated for embossing or trimming.

16 Claims, 4 Drawing Sheets

Fourth line embossing does not damage antenna 120

FIG. 1A  Embossed Card (ID-1 Format) PRIOR ART
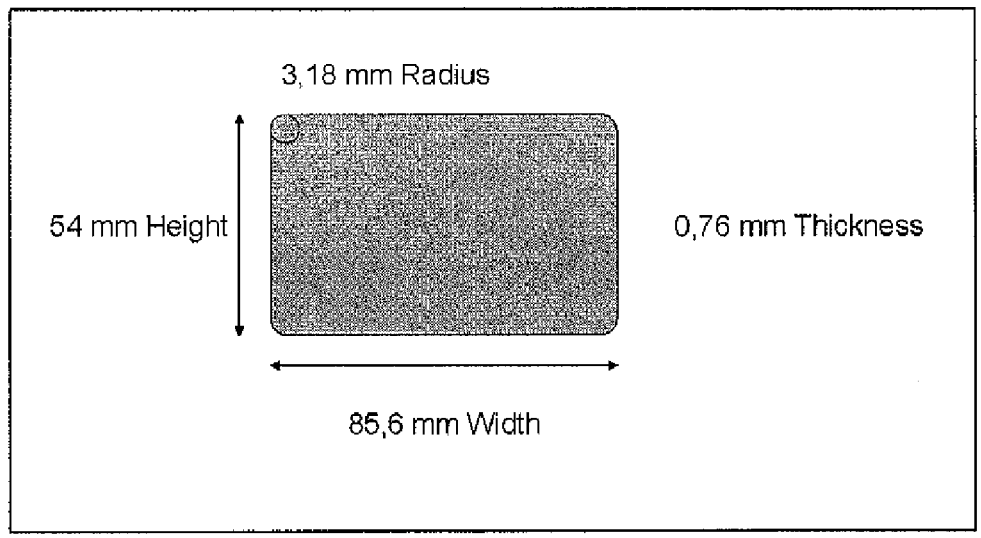
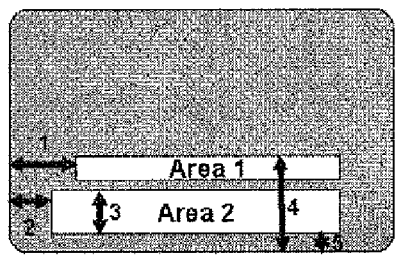
ISO 7811 normed areas
Area 1:
- Use: Identification Number
- Size: 19 characters
Area 2:
- Use: Name and Address
- Size: 4 lines of 27 characters each
1   10.18mm ± 0.25mm;
2   7.65 mm± 0.25mm;
3   14.53 mm;
4   21.42 mm± 0.12mm;  and
5   2.41 mm to 3.30 mm Fourth line embossing
typically damages
damage antenna 110

Fourth line embossing
does not damage antenna
120

SYSTEM AND METHOD ENABLING FOURTH LINE EMBOSSING ON CONTACTLESS CARDS

CROSS-REFERENCE TO RELATED APPLICATION

This application is a continuation of International Application PCT/US06/012290, filed Apr. 4, 2006, which claims the benefit of U.S. provisional patent application No. 60/668,307 filed on Apr. 4, 2005, each of which is incorporated by reference in its entirety herein.

FIELD OF THE INVENTION

This invention relates to payment cards that are used for making electronic payments. In particular, the invention relates to contactless or smart payment cards.

BACKGROUND OF THE INVENTION

Radio Frequency Identification (RFID) tags are small integrated circuits (ICs) connected to an antenna, which can respond to an interrogating RF signal with simple identifying information, or with more complex signals depending on the size of the IC. RFID technology does not require contact or line of sight for communication. Radio Frequency Identification (RFID) technology is now economically viable and is deployed in more and more commercial and industrial applications. For example, RFID technology is now widely used for tags on items in warehouses, shops, ID or access cards, etc. In addition, RFID technology has been introduced in the payment card industry (e.g., by MasterCard, American Express and Visa) in the form of "contactless" payment or credit cards embedded with RFID tags. These contactless payment cards can be used to make electronic payment transactions via radio communication with an RFID-enabled payment terminal. The contactless payment cards can provide consumers with simple, fast and convenient ways to pay for goods and services, for example, in retail establishments, stores or supermarkets.

Several RFID technologies are available for use in contactless payment cards and card readers/terminals. Contactless cards use proximity couplers to get information to and from the card's chip. An antenna is wound around the circumference of the card and activated when the card is radiated in a specific distance from the coupler. The configuration of the card's antenna and the coupler facilitate connected states from a couple of centimeters to a couple of feet. The bidirectional transmission is encoded and can be encrypted by using a combination of a card vendor's hard-coded chip algorithms; randomly generated session numbers; and the cardholder's certificate, secret key, or personal identification number (PIN). The sophistication of the connection can facilitate separate and discrete connections with multiple cards should they be within range of the coupler.

For contactless payment card systems to be economically viable and to gain commercial acceptance, the contactless payment cards must be interoperable at all or most RFID-enabled payment terminals, even when the cards and terminals have technological features that are proprietary to specific card providers/issuers, vendors or terminal manufacturers. Industry-wide interoperability is desirable. Towards this end, industry standards organizations and groups (e.g., International Organization for Standards (ISO) and International Electro Technical Committee (IEC)) have formulated voluntary industry standards for implementation of contactless payment technologies. Three such exemplary standards which have been defined by ISO/IEC are the ISO/IEC 10536, ISO/IEC 14443, and ISO/IEC 15693 standards applicable to Close Coupling, Proximity and Vicinity cards, respectively.

The physical characteristics of the contactless cards are based on the earlier ISO 7816-1 Standard for integrated circuit cards. ISO 7816-1 Standard limits the physical size of the contactless cards. A standard card size is the ID-1 size: (85.6 mm×54.0 mm×76 mm). This is the same size as a bank credit card. The ISO standards include accommodation of exposure limits for a number of electromagnetic phenomena such as X-rays, UV light, electromagnetic fields, static electrical fields, and ambient temperature of the card. Furthermore, the ISO standards defines the mechanical characteristics of a card when it is bent or flexed. This is to make sure that a plastic card with embedded chip and antenna is manufactured in a manner, which ensures acceptable operation over the expected lifetime of the card.

Commercially deployed contactless payment cards also may include features such as magnetic stripes and embossed lettering, so that the cards are operable with legacy payment-by-card infrastructure such as magnetic stripe card readers and embossed card paper imprinters that still in use in the field. Embossing allows for textual information or designs on the card to be transferred to paper by using a simple and inexpensive device. ISO 7811 specifies the embossed marks, covering their form, size, embossing height, and positioning. Use of magnetic stripe technology advantageously reduces the surfeit of paper documents associated with embossing. ISO 7811 also specifies the properties of the magnetic stripe, coding techniques, and positioning.

Consideration is now being given to improving the design of contactless payment cards. In particular attention is being directed to the design of card antennas. Card antennas that are immune or less susceptible to damage in card fabrication, and from expected wear and tear are desirable.

BRIEF DESCRIPTION OF THE DRAWINGS

Features of the invention, its nature, and various advantages will be more apparent from the following detailed description of the preferred embodiments and the accompanying drawings in which:

FIG. 1A is a schematic illustration of an embossed payment card having an ISO standard form factor.

DESCRIPTION OF THE INVENTION

The present invention provides antenna designs and layout methods for contactless payment cards. The antenna designs and layouts provide flexibility in choosing the physical characteristics of the contactless payment cards. The contactless payment cards may, for example, have spatial dimensions or geometrical shapes that are unconventional or non-standard.

A particular antenna layout reduces the susceptibility of damage to the antenna upon card embossing.

Figure 1B:
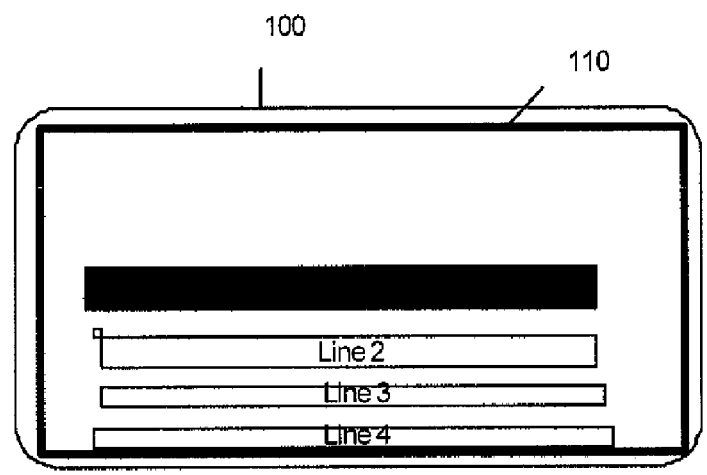
FIG. 1B is a schematic illustration of an embossed contactless payment card having a conventional antenna arrangement.

FIG. 1A shows a conventional embossed contactless payment card 100. Card 100 may have a standard form factor or dimensions, for example, an ID-1 Card format. Card 100 includes ISO 7811 normed Areas 1 and 2, which are areas designated for embossed characters or marks. Area 1, which can have up to 19 characters, may be used for embossing an identification number. Area 2, which can have up to 4 lines of 27 characters each, may be used for embossing Name and Address information. Card 100 may be made of plastic materials, for example, by laminating plastic sheets together. An inlay (i.e., a central card layer), which is laminated in the middle of the card, contains antenna 110 (FIG. 1B) and a microchip (not shown). Antenna 110, which may be a rectangular planar wire or printed antenna, is disposed along the outer edges of card 100. It is noted that the lower leg of antenna 110 is disposed in the narrow outer strip below and proximate to Area 2, which is reserved for embossing Name and Address information. As such, antenna 110 is susceptible to damage by the embossing steps in card fabrication processes. Antenna damage is particularly anticipated when the lower lines (e.g., the fourth line) of characters are embossed in Area 2. Antenna 110 also may be damaged by removal or trimming of the card corners.

In accordance with the present invention, a contactless payment card is provided with an RF antenna that is geometrically disposed only in card areas that are remote from card areas that are reserved for embossing and from card areas designated for corner trimming or rounding. The RF antenna may have a reduced size compared to the conventional size antennas (e.g., antenna 110) currently deployed in contactless payment cards. The reduced size RF antenna is designed using known antennas design techniques based on electromagnetic principles to provide adequate signal coupling for communication with contactless card readers.

Figure 2:
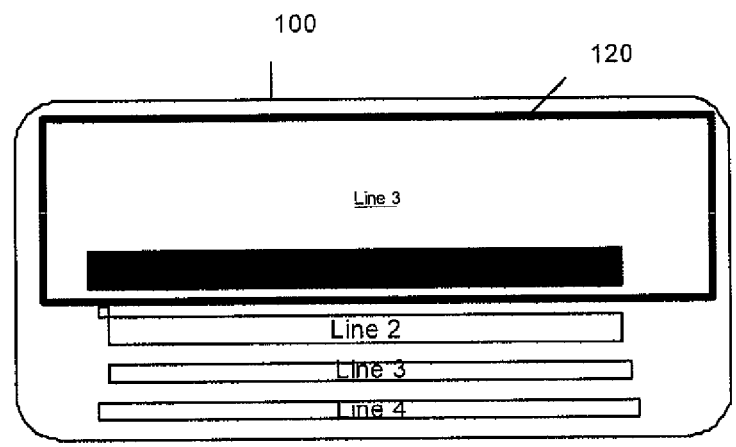
FIG. 2 is a schematic illustration of an embossed contactless payment card having an antenna layout in accordance with the principles of the present invention.

FIG. 2 shows an exemplary rectangular antenna 120 of reduced size, which is geometrically disposed away from the sensitive card areas reserved for embossing characters. As shown in FIG. 2, the lower leg or bottom segment of rectangular antenna 120, which is parallel to the bottom edge of the card, passes through the card area between Area 1 and Area 2. In other implementations of the invention, the RF antenna layout for avoiding the sensitive card areas may be based on other geometric designs. For example, rectangular antenna 120 may be disposed entirely in the card area above Area 1 (e.g., when the lower leg or bottom segment of rectangular antenna 120, which is parallel to the bottom edge of the card, is disposed above Area 1). Alternatively, rectangular antenna 120 may be disposed so that its lower leg passes between the parallel embossed character lines in Area 2 (e.g., FIG. 2 lines 2 and 3).

For the lamination/fabrication of card 100, reduced size antenna 120 may be disposed on a card inlay having a correspondingly reduced size, or a full card size inlay, as may be convenient or practical in the manufacturing process. Fourth line embossing in Area 2 is not expected to damage rectangular antenna 120 of reduced size, which is laid out as shown in FIG. 2.

Figure 3:
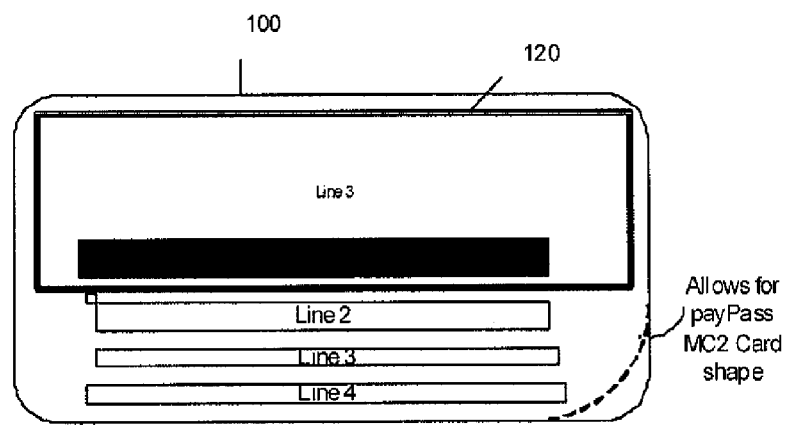
FIG. 3 is a schematic illustration of an embossed contactless payment card having an unconventional or non-standard shape and size. The embossed contactless payment card has an antenna layout in accordance with the principle of the present invention.

It will be understood that the foregoing is only illustrative of the principles of the invention, and that various modifications can be made by those skilled in the art without departing from the scope and spirit of the invention. For example, the inventive antennas of reduced size can also be used in non-ISO format cards, which have unconventional shape and/or size. A commercial example of a non-ISO format contactless card is MasterCard's PayPass MC2 card, which has a markedly curved shape. See FIG. 3). A conventional rectangular antenna (e.g., antenna 110) is incompatible with the curved shape of the MC2 card. In contrast, antenna 120 of reduced size is readily adapted for use in the MC2 card and other cards having non-conventional shape and/or size. (See FIG. 3).

The invention claimed is:

1. A method for fabricating an ISO-format contactless payment card, wherein the card has a rectangular shape and has at least two areas designated Area 1 and Area 2 defined by the ISO 7811 standard reserved for embossed characters, the method comprising:

providing an antenna on a card inlay, wherein the antenna has a reduced size compared to a conventional antenna that would lie on or about the outer edges of the ISO-format contactless payment card; and laminating the card inlay with plastic sheets to form the ISO-format contactless payment card, wherein the antenna on the card inlay has a geometrical layout so that the antenna avoids said at least two areas reserved for embossed characters when the inlay is laminated with the plastic sheets, whereby the areas reserved for embossed characters can be embossed without damaging the antenna.

2. The method of claim 1 wherein the ISO-format contactless payment card has an ID-1 size.

3. The method of claim 2 wherein providing an antenna on a card inlay comprises providing a rectangular shape antenna.

4. The method of claim 3 wherein providing an antenna on a card inlay comprises providing a rectangular-shaped antenna having four linear segments which has a geometrical layout so that bottom linear segment of the antenna parallel to a bottom edge of the payment card is disposed between Area 1 and Area 2.

5. The method of claim 3 wherein providing an antenna on a card inlay comprises providing a rectangular-shaped antenna having four linear segments which has a geometrical layout so that bottom linear segment of the antenna parallel to a bottom edge of the payment card is disposed between lines designated for embossed characters in Area 2.

6. The method of claim 3 wherein providing an antenna on a card inlay comprises providing a rectangular-shaped antenna having four linear segments which has a geometrical layout so that bottom linear segment of the antenna parallel to a bottom edge of the payment card is disposed above Area 1.

7. The method of claim 1 wherein the card inlay has a reduced size compared to the size of the payment card such that the outer edge of the card inlay is remote from a bottom edge of the payment card.

8. The method of claim 1, wherein the card inlay is substantially the same size as the payment card and the antenna is remote from a bottom edge of the payment card.

9. A contactless payment card, wherein the card has a rectangular shape and has at least two areas designated Area 1 and Area 2 defined by the ISO 7811 standard reserved for embossed characters, the contactless payment card comprising:

an antenna disposed on a card inlay, wherein the antenna has a reduced size compared to a conventional antenna that would lie on or about the outer edges of the contactless payment card, and wherein the card inlay is laminated together with plastic sheets so that the antenna avoids said at least two areas reserved for embossed characters, whereby the areas reserved for embossed characters can be embossed without damaging the antenna.

10. The contactless payment card of claim 9, wherein the contactless payment card has an ISO-format ID-1 size.

11. The contactless payment card of claim 10, wherein the antenna on the card inlay is a rectangular shaped antenna.

12. The contactless payment card of claim 11, wherein the antenna on the card inlay is a rectangular shaped antenna having four linear segments and which has a geometrical layout so that bottom linear segment of the antenna parallel to a bottom edge of the payment card is disposed between Area 1 and Area 2.

13. The contactless payment card of claim 11, wherein the antenna on the card inlay is a rectangular shaped antenna having four linear segments and which has a geometrical layout so that bottom linear segment of the antenna parallel to a bottom edge of the payment card is disposed between lines designated for embossed characters in Area 2.

14. The contactless payment card of claim 11, wherein the antenna on the card inlay is a rectangular shaped antenna having four linear segments and which has a geometrical layout so that bottom linear segment of the antenna parallel to a bottom edge of the payment card is disposed above Area 1.

15. The contactless payment card of claim 9, wherein the card inlay has a reduced size compared to the size of the payment card such that the outer edge of the card inlay is remote from a bottom edge of the payment card.

16. The contactless payment card of claim 9, wherein the card inlay is substantially the same size as the payment card and the antenna is remote from a bottom edge of the payment card.

* * * * *